(12) United States Patent
Girard et al.

(10) Patent No.: US 7,459,117 B2
(45) Date of Patent: Dec. 2, 2008

(54) METHOD FOR CURING TIRES USING A SELF-LOCKING TIRE MOLD

(75) Inventors: Jean-Claude Girard, Copley, OH (US); Michael Thomas Driscoll, Akron, OH (US); Mark Anthony Sieverding, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 923 days.

(21) Appl. No.: 10/417,849

(22) Filed: Apr. 17, 2003

(65) Prior Publication Data

US 2004/0207116 A1   Oct. 21, 2004

(51) Int. Cl.
*B29C 35/00* (2006.01)
(52) U.S. Cl. .................. 264/326; 156/110.1; 425/47
(58) Field of Classification Search .............. 264/315, 264/326; 156/110.1, 130, 129, 396; 425/35, 425/47, 451.9
See application file for complete search history.

(56) References Cited

U.S. PATENT DOCUMENTS

| | | | | |
|---|---|---|---|---|
| 3,229,013 A * | 1/1966 | Schwartz et al. | ............ | 264/229 |
| 3,276,930 A * | 10/1966 | Keefe, Jr. | ............ | 156/130 |
| 3,553,789 A | 1/1971 | Allitt | ............ | 18/42 |
| 3,833,323 A | 9/1974 | Pasch | | |
| 3,990,821 A | 11/1976 | MacMillan | ............ | 425/19 |
| 4,025,251 A * | 5/1977 | Cantarutti | ............ | 425/31 |
| 4,653,992 A | 3/1987 | Baraldi | ............ | 425/23 |
| 4,738,738 A * | 4/1988 | Holroyd et al. | ............ | 156/129 |
| 4,895,692 A | 1/1990 | Laurent et al. | ............ | 264/326 |
| 5,180,592 A | 1/1993 | Laurent | ............ | 425/46 |
| 5,676,980 A | 10/1997 | Gulka et al. | ............ | 425/40 |
| 5,820,886 A | 10/1998 | Irie | ............ | 425/47 |
| 5,853,526 A * | 12/1998 | Laurent et al. | ............ | 156/396 |
| 6,158,998 A | 12/2000 | Irie | ............ | 425/34.1 |
| 6,250,901 B1 | 6/2001 | Nagata | ............ | 425/46 |
| 6,610,238 B1 * | 8/2003 | Steidl et al. | ............ | 264/297.5 |
| 6,702,912 B1 * | 3/2004 | Oku et al. | ............ | 156/110.1 |
| 6,808,377 B1 * | 10/2004 | Loney et al. | ............ | 425/47 |

FOREIGN PATENT DOCUMENTS

| | | |
|---|---|---|
| DE | 196 18 081 A1 | 11/1997 |
| EP | 0 685 321 A1 | 12/1995 |
| EP | 0 727 296 A2 | 8/1996 |
| EP | 1 052 085 A1 | 11/2000 |
| EP | 1211055 | 6/2002 |

(Continued)

*Primary Examiner*—Mathieu D. Vargot
(74) *Attorney, Agent, or Firm*—Richard B. O'Planick

(57) ABSTRACT

A segmented mold 2 for molding a tire 100 is described which has a central axis; plurality of radially movable tread forming segments; two sidewall forming plates, a top sidewall forming plate 8, and a bottom sidewall forming plate 6; a top locking ring 10 having a plurality of circumferentially spaced means 30 for locking the segments 4, each means for locking 30 providing a predetermined angular path 75 for radially contracting the segments 4 upon closing the mold 2 in a locked position. The segmented 2 mold for molding a tire 100 further has a bottom locking ring 20 having a complementary plurality of circumferentially spaced means 30 for locking the segments 4, each means for locking 30 providing a predetermined angular path for radially contracting the segments 4 upon closing the mold.

8 Claims, 14 Drawing Sheets

| | FOREIGN PATENT DOCUMENTS | |
|---|---|---|
| FR | 1082246 | 12/1954 |
| FR | 1387439 | 1/1965 |
| GB | 1220492 | 1/1971 |
| GB | 2 001 896 | 2/1979 |
| JP | 7 186148 | 7/1995 |
| JP | 2002307442 | 10/2002 |
| JP | 337146 | 11/2002 |
| JP | 2002337146 | 11/2002 |
| SU | 426856 | 5/1974 |
| WO | WO 99/25542 | 5/1999 |

* cited by examiner

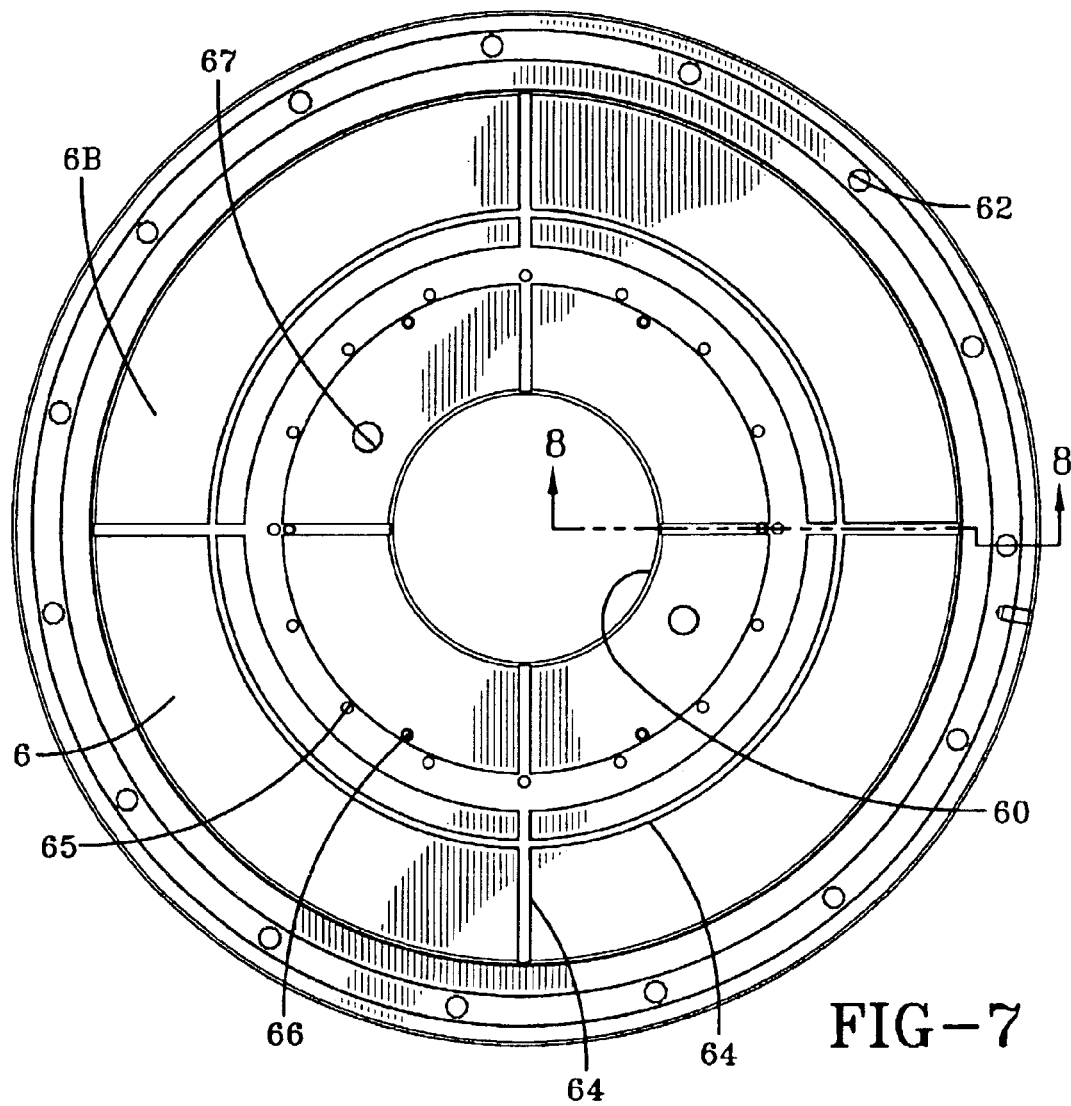
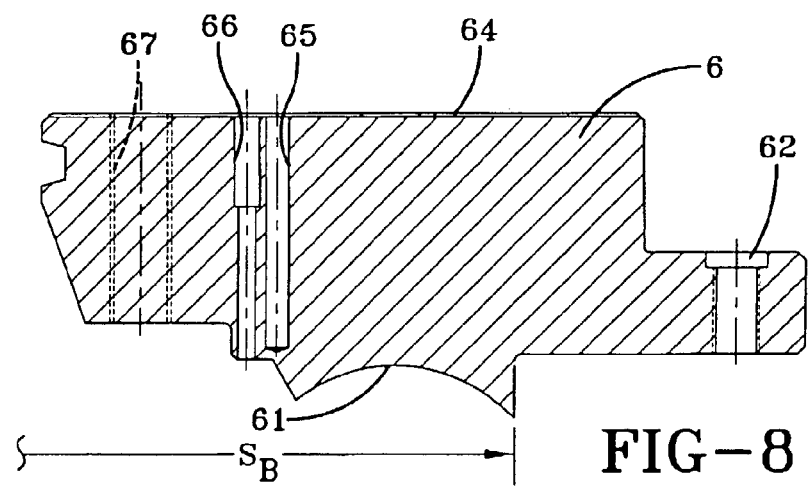

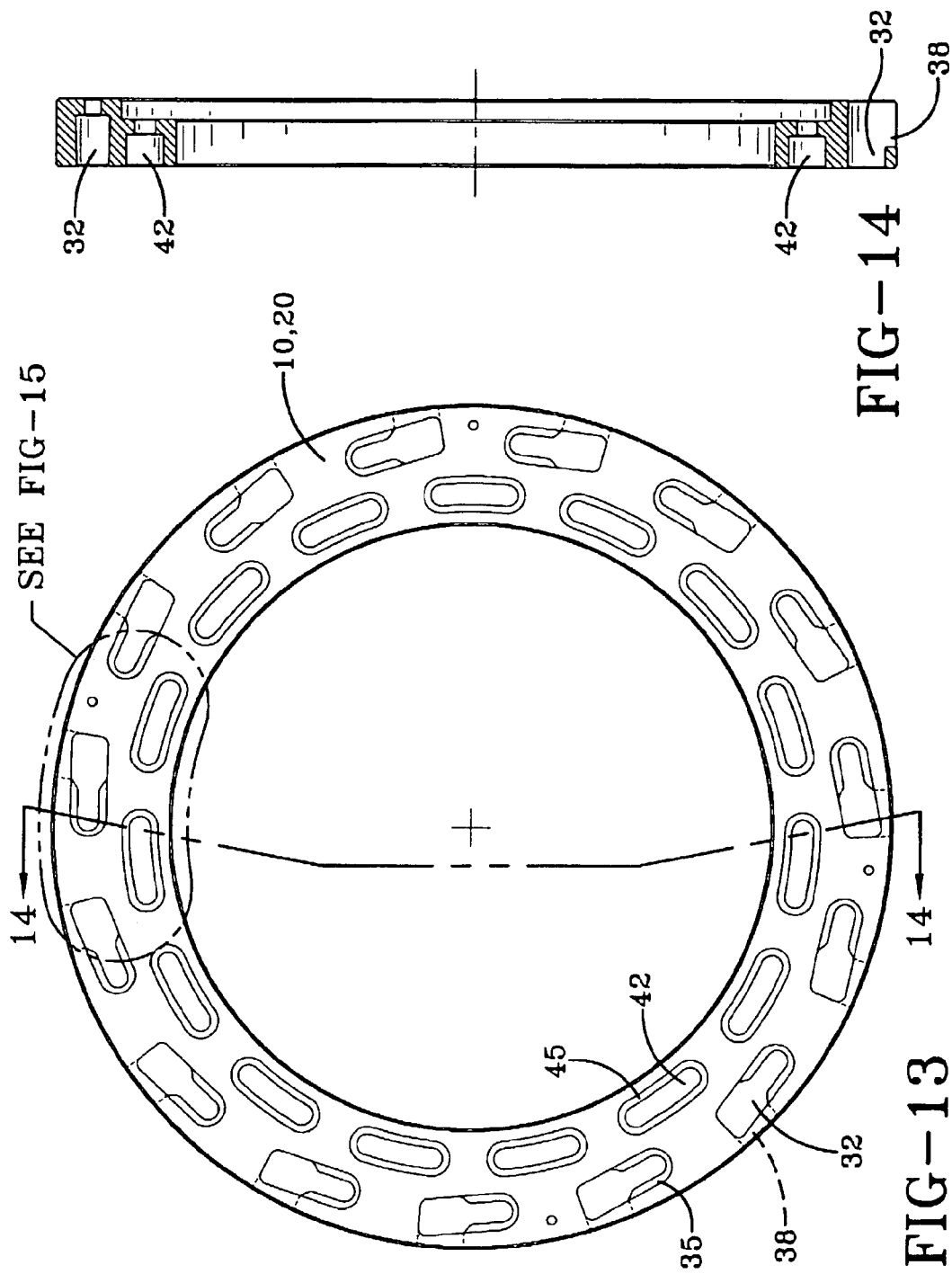

METHOD FOR CURING TIRES USING A SELF-LOCKING TIRE MOLD

FIELD OF THE INVENTION

This invention pertains to the art of tire molding and methods to cure pneumatic tires, more specifically to methods and apparatuses for a self-locking mold cure system.

BACKGROUND OF THE INVENTION

It is known to vulcanize uncured or green tires using a mold in a tire press. Commonly, the molds have a top and a bottom mold half, within which the green tire is cured. The tire press includes devices for opening the mold, usually by lifting the top half from the bottom half, lifting the green tire into the bottom half and closing the top half, thereby encasing the green tire within the tire mold. A tire bladder is inserted inside the mold and the green tire and inflated to press the green tire into the sidewall and tread forming surfaces of the mold as heat and pressure are applied to the tire to cure it. After a predetermined time the mold is opened and the cured tire is removed from the press.

This two piece type mold for curing a tire has several drawbacks and therefore is suitable for low cost tire manufacture but when superior uniformity and quality is required the molds used for curing tires employ radially expandable segmented molds. These segmented molds have a pair of sidewall curing plates, a top plate and a bottom plate, and a plurality of tread forming segments.

The green tire is placed into these segmented molds when the top sidewall forming plate is opened and the plurality of tread forming segments are expanded in a radially open condition. When the tire is positioned inside the mold the segments are contracted radially inwardly to form an annular tread forming ring and the top sidewall plate is closed encasing the green tire. Again heat and pressure are applied and an inflatable bladder pushes the green tire into the mold as the tread and sidewall surfaces are created in the mold. Once cured the mold is opened and the cured tire is removed.

A common problem of molding tires using either two piece tire molds or segmented molds is the green tire must be expanded radially from its toroidially shaped form. This expansion causes movement of the components and the cords forming the belt structure and the plies of the carcass structure. Ideally, the green tire should be built very close to the tire's finished or cured shape. Neither the two piece tire molds nor the segmented molds described above are designed to achieve this ideal construction and molding objective.

A secondary problem of such building equipment is a large amount of equipment is used to cure a tire and most of this equipment sits idle as the mold curing cycle progresses. In WO99/25542 this issue was disclosed as an economically inefficient way of using capital resources. In that prior art patent they suggested employing a self-locking mold cure system with shared mold open, unload and close devices. This enabled several molds to be processed along four horizontally spaced parallel process lines.

The self-locking mold locked the top mold half to the bottom mold half by employing a lock mechanism. The lock mechanism included a lock cylinder, a lock frame having locking motors lock rods, with quick disconnect couplings and a lock ring. To lock the segmented mold 10, the lock cylinder lowers the lock frame until the lock ring is positioned around the segmented mold. This locked the segmented mold in the closed position. Once closed the lock motors are driven disconnecting the lock rods at the quick disconnect couplings. The locked mold is then capable of being transported to a curing station and once the tire is cured the mold can be unlocked wherein the lock mechanism is lowered by the lock cylinder so that the lock rods can engage the lock ring at the quick connect couplings. Next, the lock motors are driven causing the quick connect couplings to connect with the lock rods. This reconnects the lock rods with the lock rings. The locking cylinder is then raised, lifting the lock ring and thereby unlocking the segmented mold.

As can be appreciated the above mold employs numerous rods and coupling devices to create a self-locking mold. This creates a complexity that greatly diminished the value of such a molding system.

The present invention has the objective of creating a simple self-locking mold capable of superior strength without requiring numerous skeletal type rods and couplings as described above.

It is a further objective of the present invention to provide a mold that can accept the green tire and its building core internally while maintaining the tire's as-built dimensions very close to the as-molded dimensions.

SUMMARY OF THE INVENTION

A segmented mold for molding a tire is described which has a central axis; a plurality of radially movable tread forming segments; two sidewall forming plates, a top sidewall forming plate, and a bottom sidewall forming plate; a top locking ring having a plurality of circumferentially spaced means for locking the segments, each means for locking providing a predetermined angular path for radially contracting the segments upon closing the mold in a locked position. The segmented mold for molding a tire further has a bottom locking ring having a complementary plurality of circumferentially spaced means for locking the segments, each means for locking providing a predetermined angular path for radially contracting the segments upon closing the mold.

The segmented mold for molding a tire preferably has the top sidewall plate attached to the top locking ring and the bottom sidewall plate attached to the bottom locking ring.

The means for locking the segments of the top locking ring includes a slotted opening having a release end and a closed end extending along a radially decreasing angular path. The angular path of the slotted opening of the means for locking the segments of the top locking ring is preferably linear.

Additionally, the means for locking the segments of the bottom locking ring may include a slotted opening having a release end and a closed end extending along a radially decreasing angular path. The angular path of the slotted opening of the means for locking the segment of the bottom locking ring is preferably linear. The angular path of the top locking ring is oppositely inclined relative to the angular path of the bottom locking rings. The predetermined angular path of each locking means extends circumferentially less than 10° relative to the central axis.

The segmented mold for molding a tire has an enlarged opening for accepting a green tire assembly. The top sidewall forming plate has a radially outer diameter of $S_T$ at the sidewall forming surface and the bottom sidewall forming plate has a radially outer diameter $S_B$ at the sidewall forming surface; a top tread shoulder forming annular ring adjacent the top sidewall forming plate and abutting along the diameter $S_T$; and wherein the top sidewall forming plate and the top tread shoulder forming annular ring are removable to permit insertion and removal of the tire.

A method of curing a tire under heat and pressure is described which has the steps of building an uncured tire assembly on a building drum core assembly; preheating a segmented mold, the mold having a plurality of radially movable segments and a top plate the top plate having a sidewall forming ring and a tread shoulder forming ring; opening the top plate; inserting the uncured tire assembly while mounted on the building drum core into the open mold; closing the top plate; contracting the radially movable segments; applying pressure to the building drum core forcing the carcass against the tread belt and the tread forming mold segments; curing the tire; opening the top plate; radially expanding the tread forming segments; removing the cured tire.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directions radially toward or away from the axis of rotation of the tire.

"Radial Ply Tire" means a belted or circumferentially restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane "Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which:

FIG. 7 is a plan view of the bottom plate;

FIG. 8 is a cross-sectional view of the bottom plate taken along lines 8-8;

FIG. 13 is a plan view of the locking ring, the locking ring of the top and the bottom of the mold as shown being identical;

FIG. 14 is a cross sectional view of the locking ring taken along lines 14-14;

DETAILED DESCRIPTION OF THE INVENTION

Figure 1:
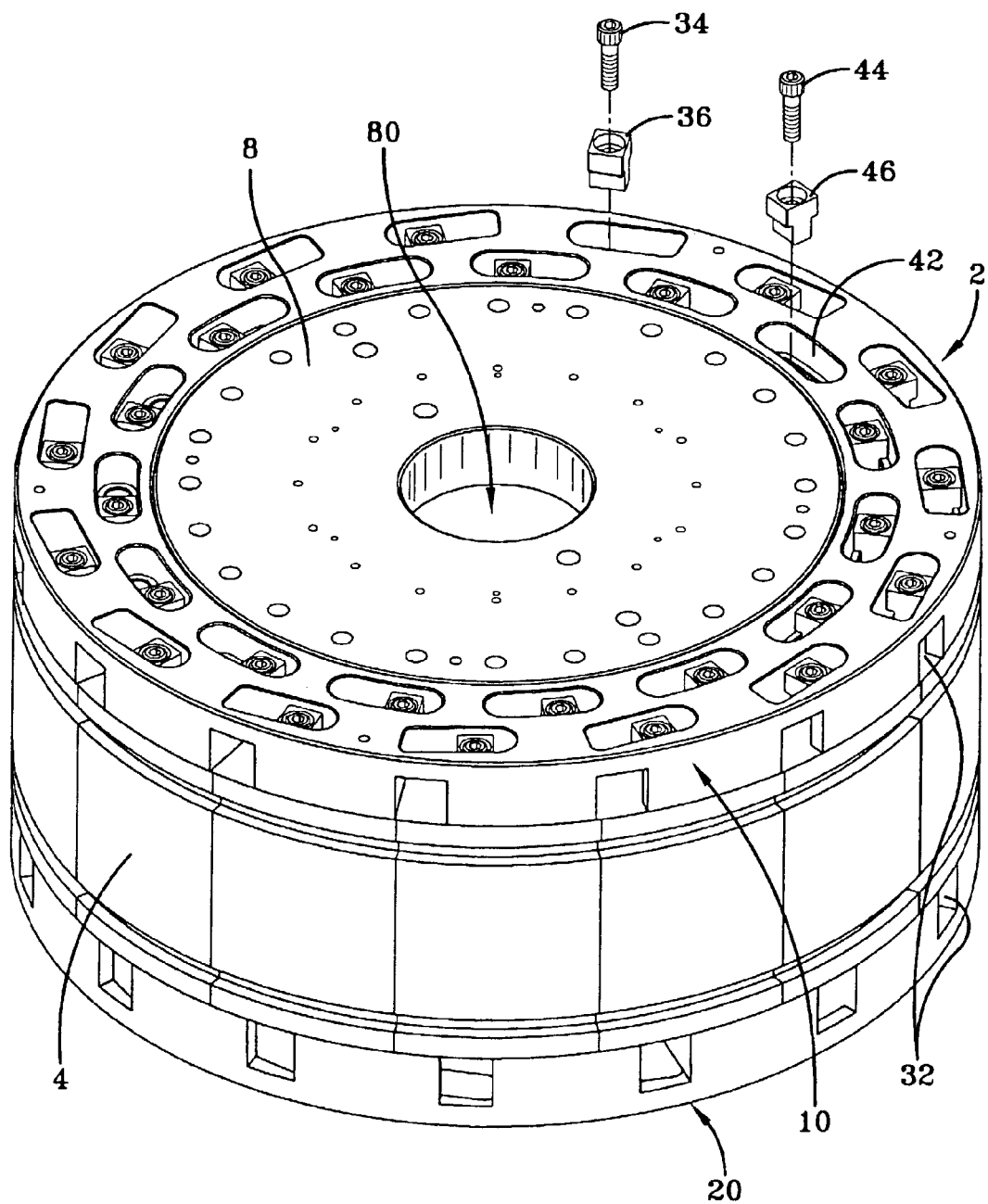
FIG. 1 is a perspective view of the self-locking mold according to the present invention.

A self-locking mold 2 is illustrated in FIG. 1. The mold has a plurality of radially movable segments 4, a bottom sidewall forming plate assembly 6 and a top sidewall forming plate assembly 6. The top and bottom sidewall forming plate assemblies are retained by a top breach lock ring 10 and a bottom breach lock ring 20.

Figure 2:
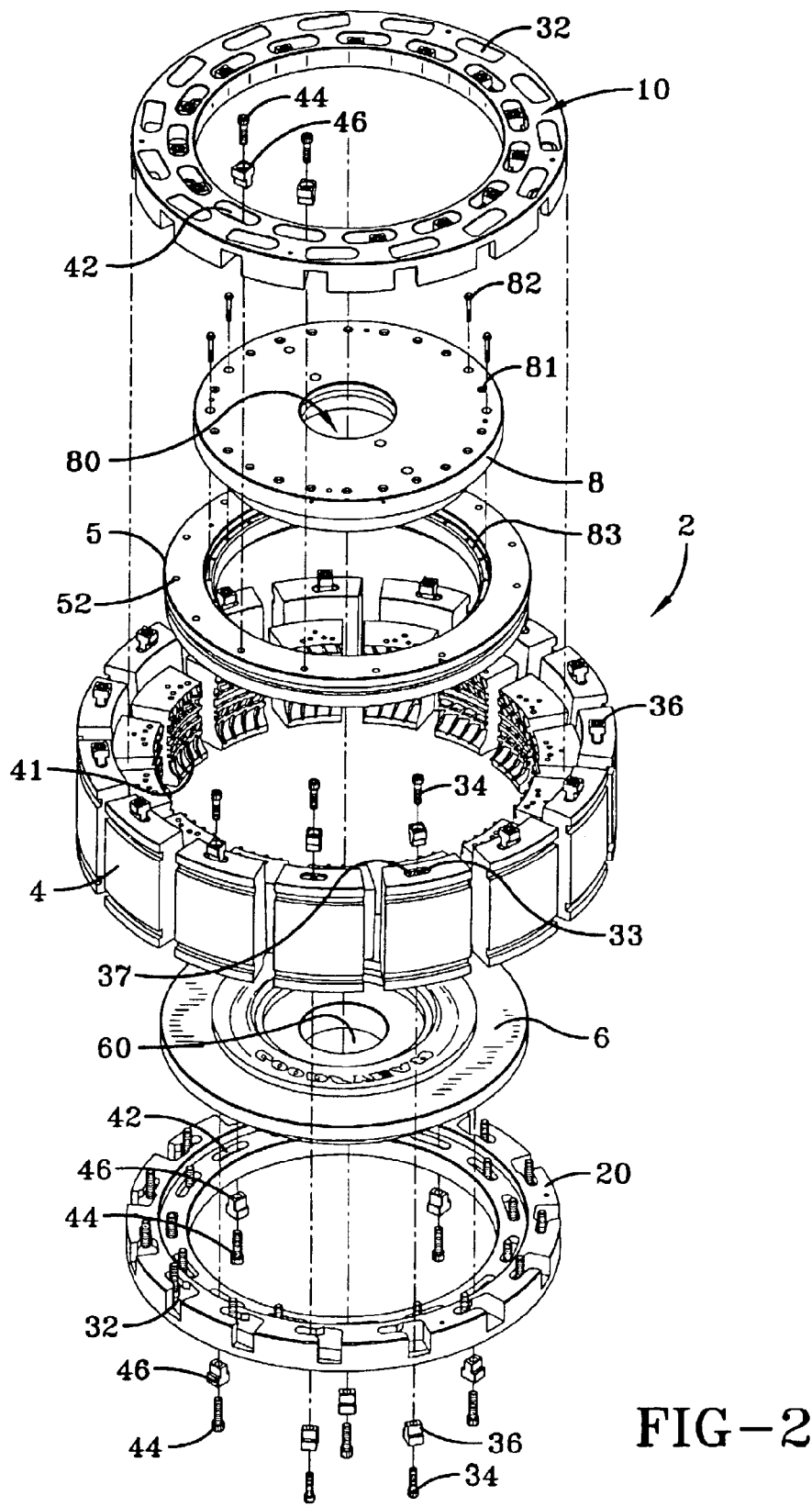
FIG. 2 is an exploded view of the self-locking mold of FIG. 1.

With reference to FIG. 2, an exploded view of the self-locking mold 2 is shown where the components can be more easily seen. Both the bottom breach locking ring 20 and the top breach locking ring 10 have slotted openings 32 which permit a threaded fastener bolt 34 with a bolt collar 36 to pass during the opening and closing of the breach locking rings 10, 20. The top and bottom breach locking rings 10, 20 also have an inner ring of slotted openings 42 for retaining the upper or top sidewall forming plate 8 and the bottom sidewall forming plate 6.

Figure 3:
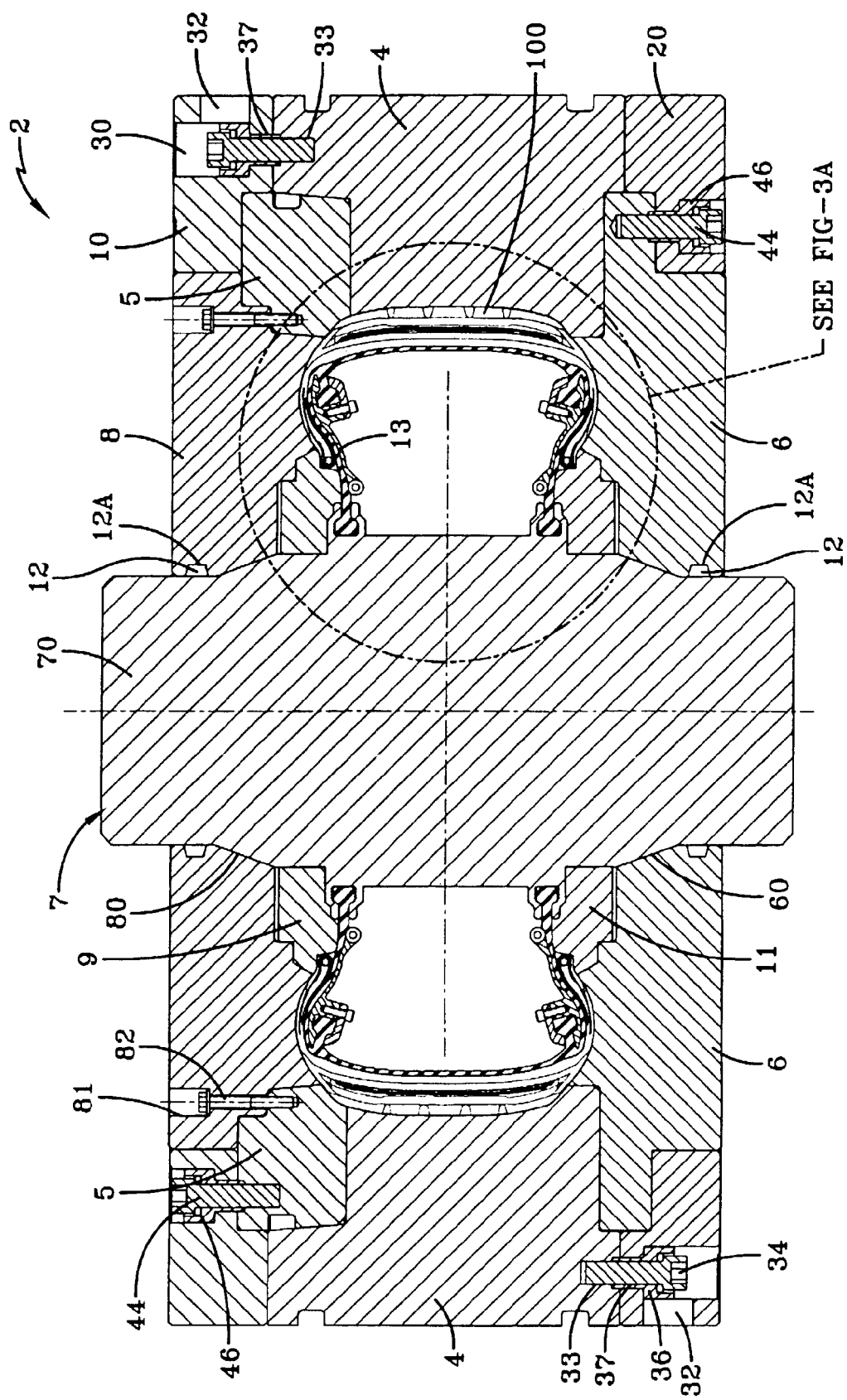
FIG. 3 is a cross-sectional view of the self-locking mold with a tire to be cured and the center core assembly illustrated.
Figure 3A:
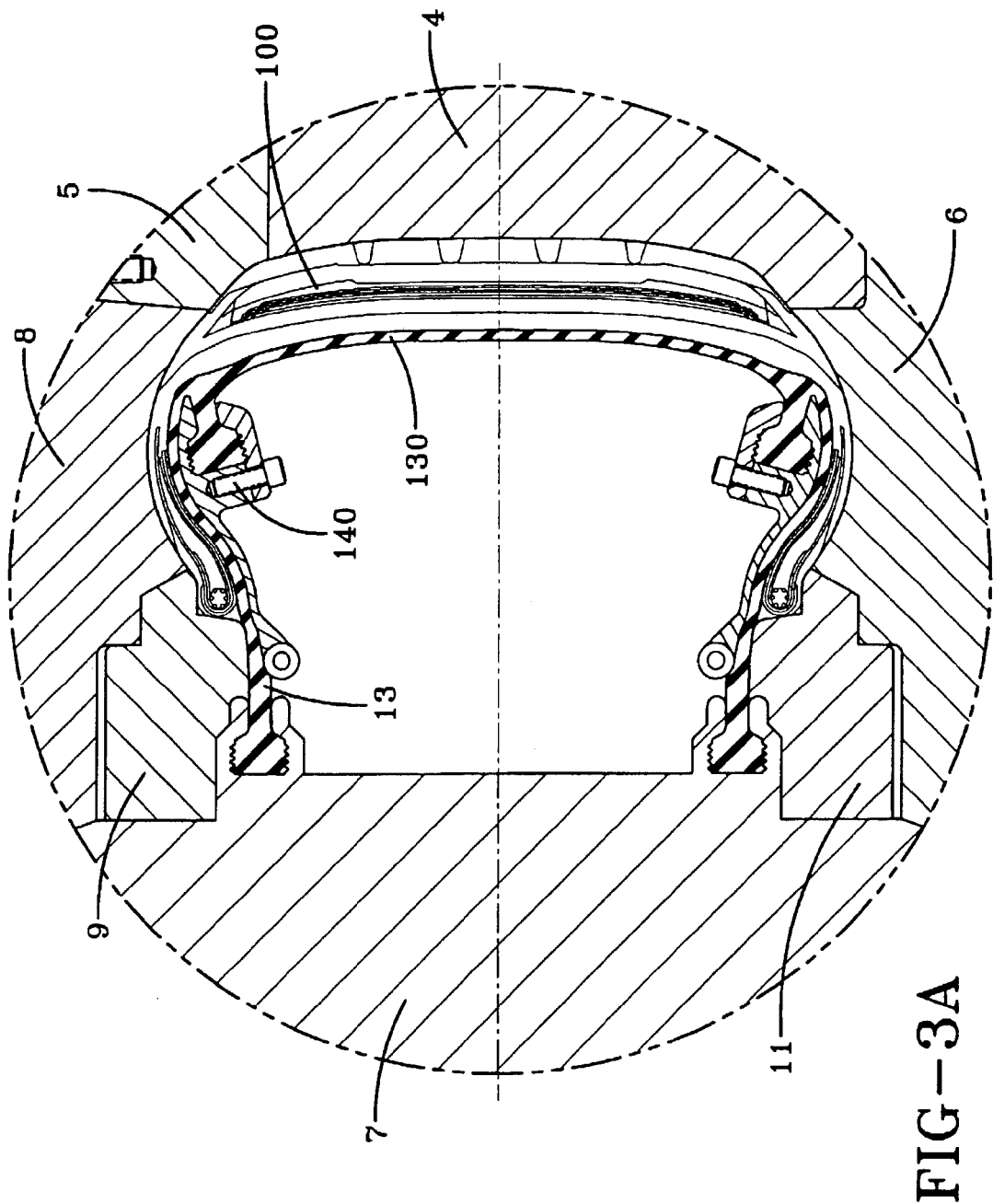
FIG. 3A is an enlarged fragmentary view of the tire in the self-locking mold taken from FIG. 3.

With reference to FIG. 3, a cross-sectional view of the mold 2 is shown wherein a tire 100 is mounted on a core building drum assembly 7. The core building drum assembly 7 includes a top mold bead ring 9, a bottom mold bead ring 11, a bladder 13, and a pair of retractable locking rings 12 which engage the top sidewall forming plate 8 and the bottom sidewall forming plate 6 to secure the building drum core assembly 7 in the mold 2. As illustrated, the primary shaft 70 of the core building drum assembly 7 is tapered and correspondingly aligns and secures itself into tapered openings 80, 60 of the top sidewall forming plate 8 and bottom sidewall forming plate, respectively, thereby securely aligning the assembly 7. As further illustrated, an uncured tire 100 is shown mounted onto the inflatable bladder assembly 13. The core building drum assembly 7 is as described in U.S. patent application Ser. No. 10/388,733, filed Mar. 14, 2003, entitled "Radially Expandable Tire Assembly Drum and Method for Forming Tires", the contents of which are incorporated herein by reference in its entirety. As illustrated this entire core building drum assembly 7 with a green or uncured tire 100 is inserted into the mold 2. To accomplish this the top and bottom plate locking rings 10, 20 are rotated and the radially expandable segments 4 are in an expanded position providing sufficient clearance such that the tire 100 and core building drum assembly 7 can be placed on the bottom sidewall forming plate 6, the shaft 70 passing through opening 60 as illustrated. Once inserted and fully seated, the locking ring 12 engages the slot 12A in the bottom forming plate 6. The bottom bead ring 11 is already in position at that time. The assembly 7 is inserted into the mold 2. Then the top plate 8 is inserted over the core building drum assembly 7 and the locking ring 12 engages the slot 12A of the top plate 8. The radially expandable segments 4 are then closed and brought into a tight fitting arrangement by a rotation of the top breach locking ring 10 and bottom breach locking ring 20. A radially inward movement of the segments 4 is achieved because the outer slotted opening 32 has a straight inclined surface 35 that ensures that as the locking ring 10 or 20 is rotated it forces against the collar 46 and bolts 44 in a manner to force the segments 4 to move radially inward in a full abutting arrangement. Once closed, internal or media pressure is provided internally through the core building drum assembly 7 providing additional pressure to press against the bladder 13 which forces the tire 100 into the tread face 41 of the mold segments 4. This is as shown in FIG. 3A. In the illustrated embodiment the bladder 13 includes a flexible membrane 130 and also mechanical supports 140 to provide a rigid structure along the sidewalls of the tire which assists in the tire building operation. It is understood that a more simple inflatable bladder 13, as in more conventional tire curing presses, could be used without the addition of the sidewall supporting structure 140 as illustrated in FIGS. 3 and 3A.

An important feature enabling the tire 100 to be inserted into the mold 2 is the unique top tread shoulder ring 5. The top tread shoulder ring 5 is attached securely to the top sidewall forming plate assembly 8, thus when the top sidewall forming plate assembly 8 is removed to insert the tire 100 on the core building drum assembly 7 this provides sufficient clearance at a large enough diameter such that the tire 100 can be inserted in a fashion that more closely approximates the as-molded finished tire condition. As can be seen, the tread shoulder ring 5 has a minimum diameter $D_T$ and a larger diameter $D_O$, $D_T$ abutting at the diameter $S_T$ that extends inwardly along the shoulder of the tire towards the sidewall. For the tire to fit in the mold if this component 5 were not a removable assembly would mean that the tire 100 had to be built sufficiently smaller to clear the tread shoulder smaller diameter. This in turn would mean that the tire 100 upon molding would have to be expanded to a much greater percentage of its overall section height in order to press the tread into the tread forming face 41 of the inner molding surface of the radially movable segments 4. By using a tread shoulder ring 5 that is removable upon assembly, the tire 100 can be inserted into the mold 2 at a diameter very close to the fully expanded diameter. Accordingly, when the bladder 13 is inflated, the tire 100 only has to move a fraction of the percentage radially outward to press into the tread forming face 41 of the segment 4. Additionally, the unique slotted openings 32 of the breach locking rings 10, 20 provide an additional closure of the radially outer segments 4 driving them into the uncured tread rubber such that only a very small fraction of radial expansion is required of the bladder 13 during curing. It has been found that by building the tire 100 to the almost as-molded condition, virtually no movement of the underlying cord reinforcing structures has to occur during the curing. In other words, the tire 100 when built on the core building drum assembly 7 is cured it is at almost the same dimension as built. This ensures that there is minimal slippage of the components as the tire 100 is cured. This is a substantial departure from the current method of manufacturing tires.

For a better understanding of the various components comprising this self-locking mold 2 according to the present invention, reference is directed to FIGS. 4 through 19.

Figure 4:
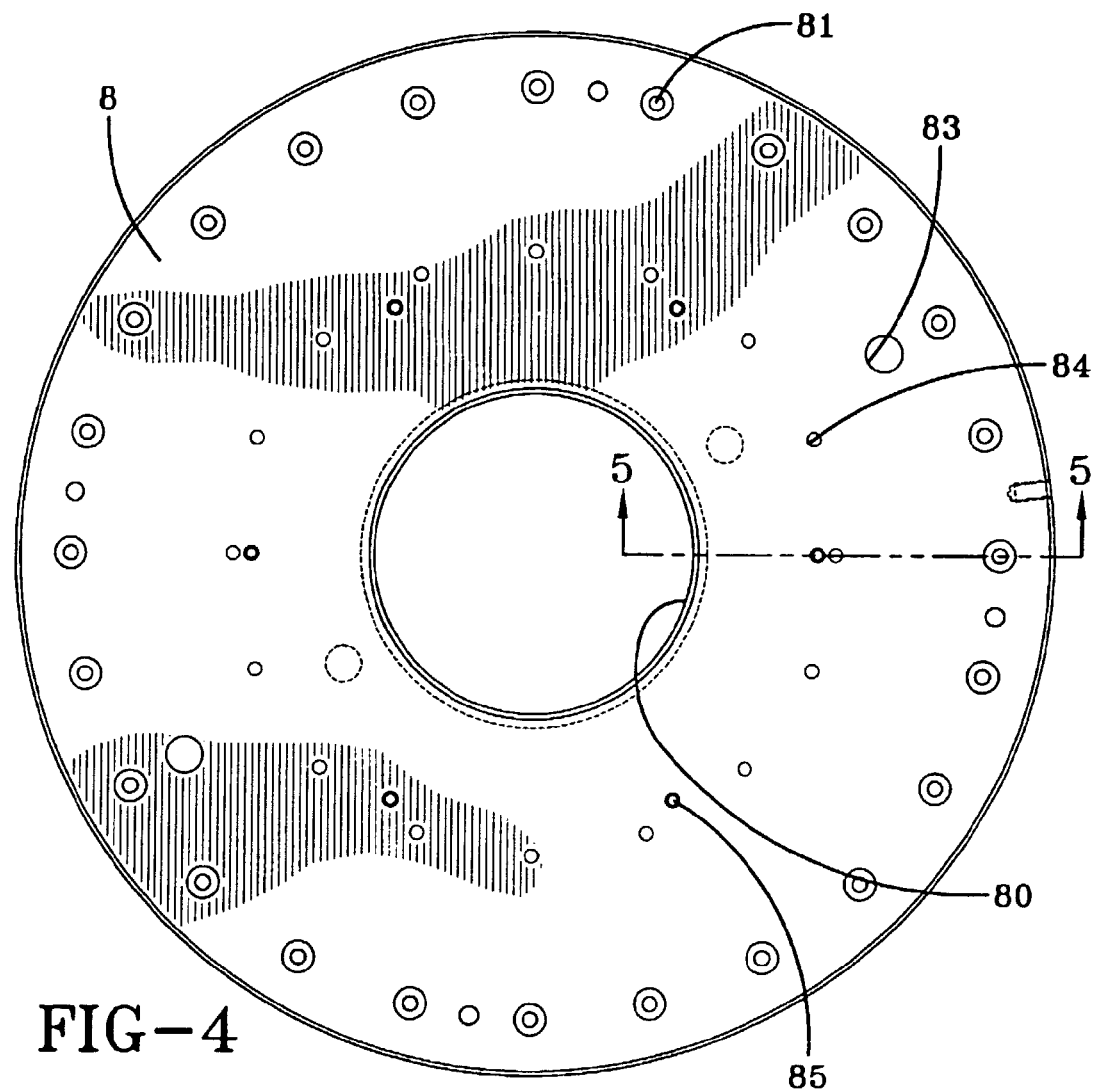
FIG. 4 is a plan view of a top sidewall plate.
Figure 5:
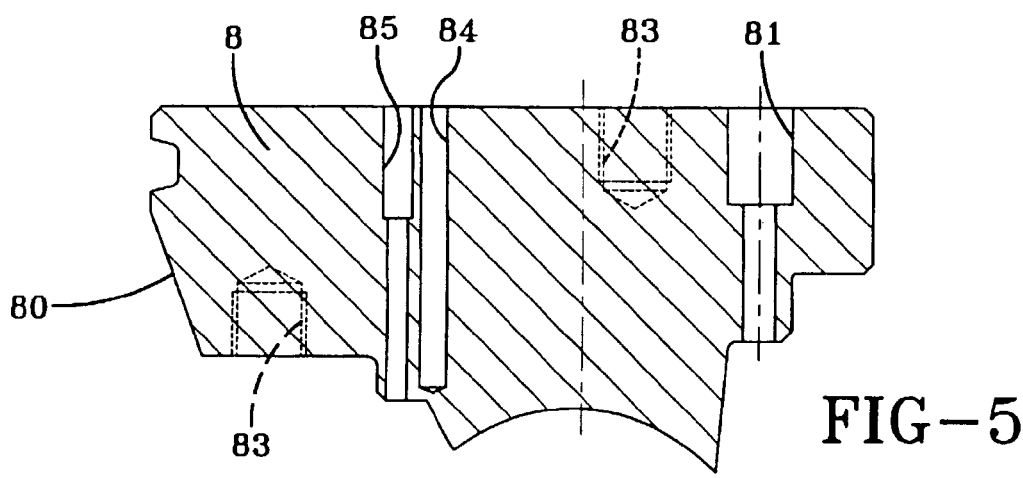
FIG. 5 is a cross section of the top sidewall forming plate taken along lines 5-5 of FIG. 4.
Figure 18:
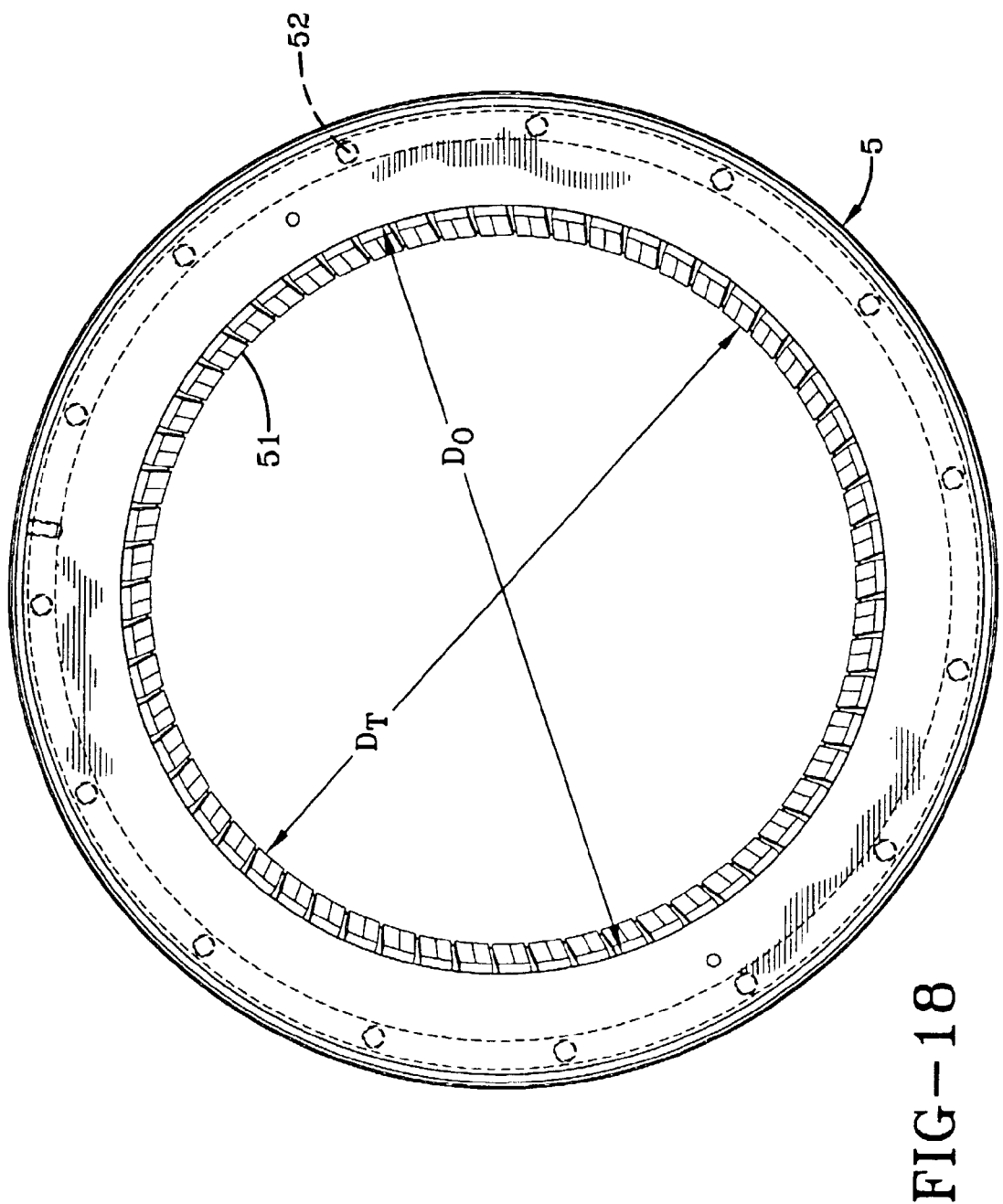
FIG. 18 is a plan view of the tread shoulder forming ring.
Figure 19:
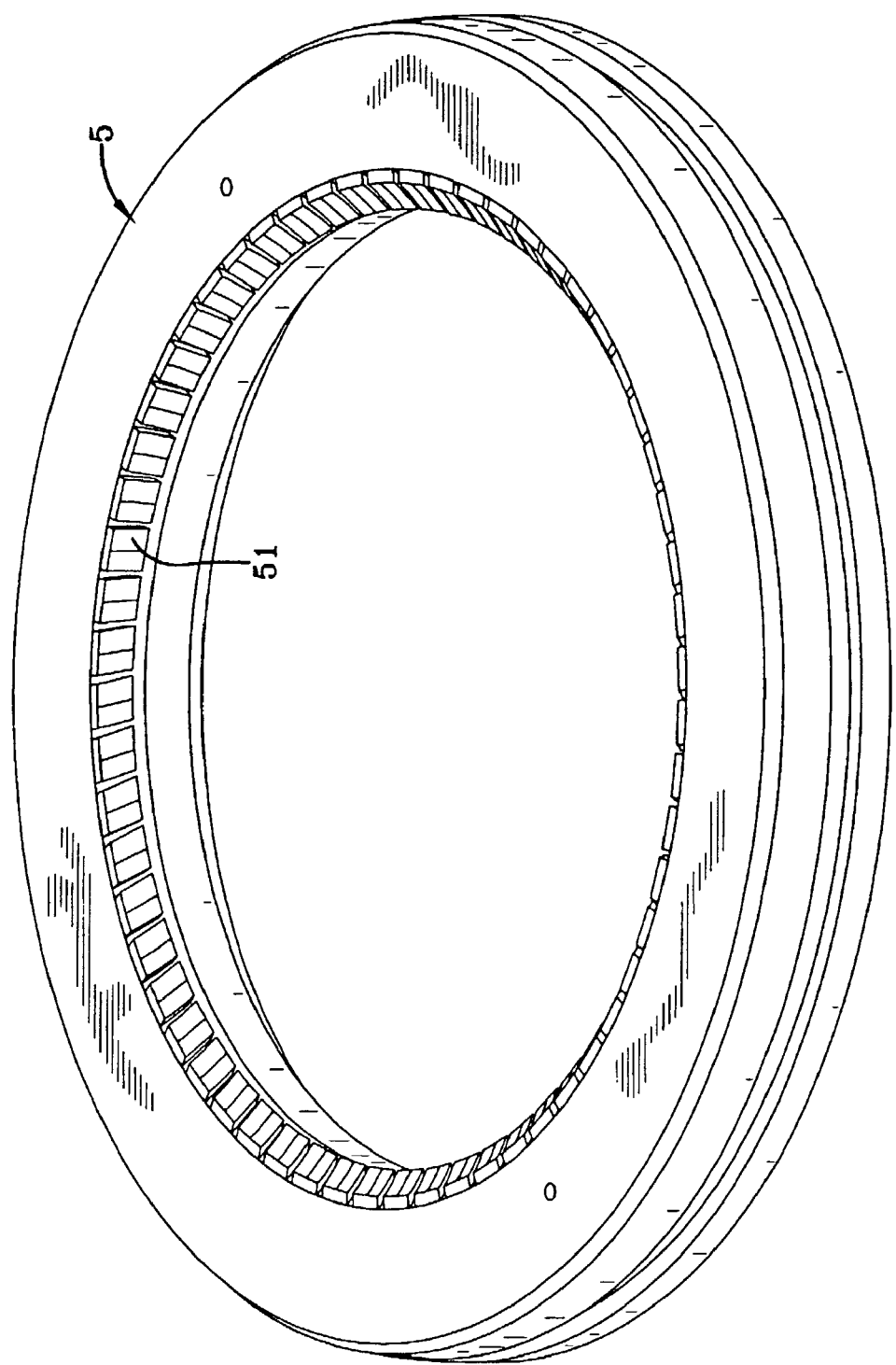
FIG. 19 is a perspective view of the tread shoulder forming ring.

FIG. 4 illustrates a plan view of the top sidewall forming plate 8. As illustrated, the top sidewall forming plate 8 has a central opening 80 tapered to accept the shaft 70 of the core building drum assembly 7. As illustrated, on the radially outer diameter of the top sidewall forming plate 8 is a plurality of holes or openings 81 having a shoulder and a reduced diameter on the radially inner portion as illustrated in FIG. 5. These holes 81 accept the threaded fastener 82 which provides an attachment means to the tread shoulder forming ring 5 at the plurality of threaded holes 81 as illustrated in FIGS. 18 and 19. Radially inward of the holes 81 are a plurality of attachment holes 83 that are threaded and provide means for attaching lifting devices. Additionally, a plurality of radially inner holes 85 are illustrated which provide a means for bead ring attachment.

Figure 6:
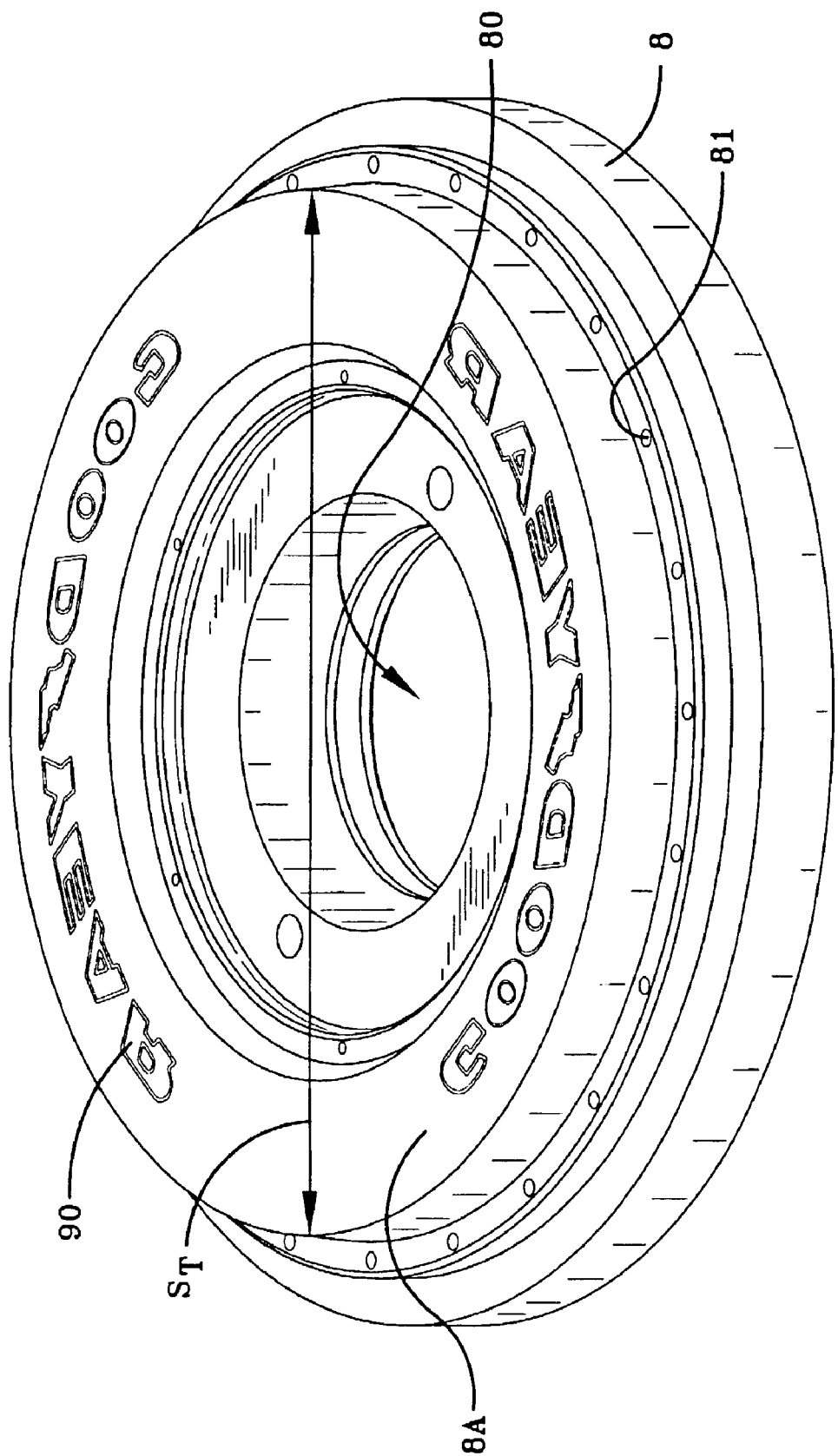
FIG. 6 is a perspective view of the top sidewall forming plate.
Figure 9:
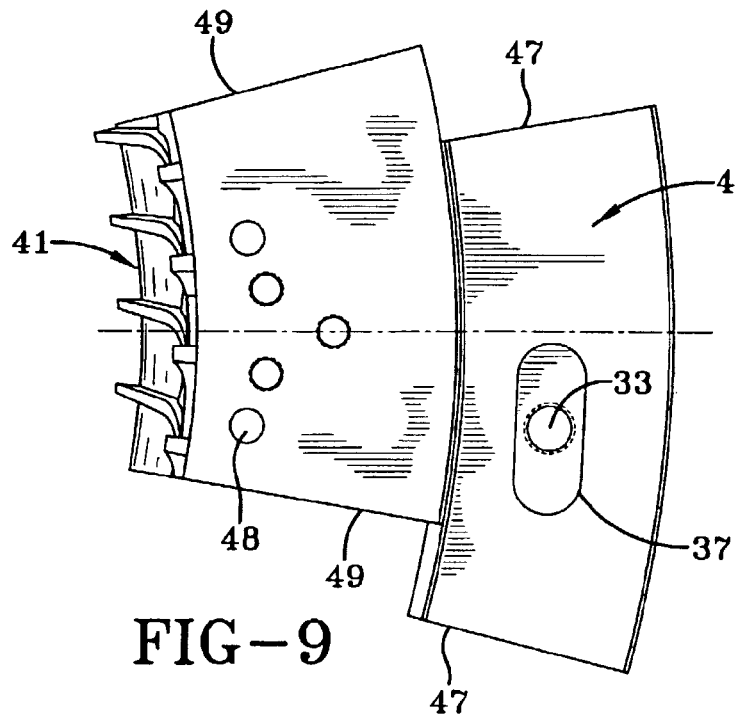
FIG. 9 is a top view of one of the radially movable tread forming segments.

FIG. 6 shows the top sidewall forming plate 8 in a perspective view wherein the trademark or trade name 90 of the tire 100 to be molded into the cured tire is illustrated as a reversed image. Once molded as shown the name "Goodyear" would be illustrated in two places on the tire 100 as an example. Radially outward of the sidewall forming plate surface 8A and abutting at $S_T$ would be where the tread shoulder ring 5 would be bolted through the attachment molds 81 as illustrated in FIG. 2.

With reference to FIGS. 7 and 8, the bottom sidewall forming plate 6 is illustrated. The bottom sidewall forming plate 6 has a plurality of holes 62 that are threaded and adapted to accept the threaded fasteners 44 as shown in FIG. 2. The bottom surface 6B of the bottom sidewall forming plate 6 includes a plurality of channels 64 for sidewall venting purposes. Additionally, a plurality of radially inner venting holes 65 and bead ring attachment holes 66 are shown. Further radially inwardly are two large holes 67 that are threaded, as illustrated, which provide a means for lifting.

Figure 10:
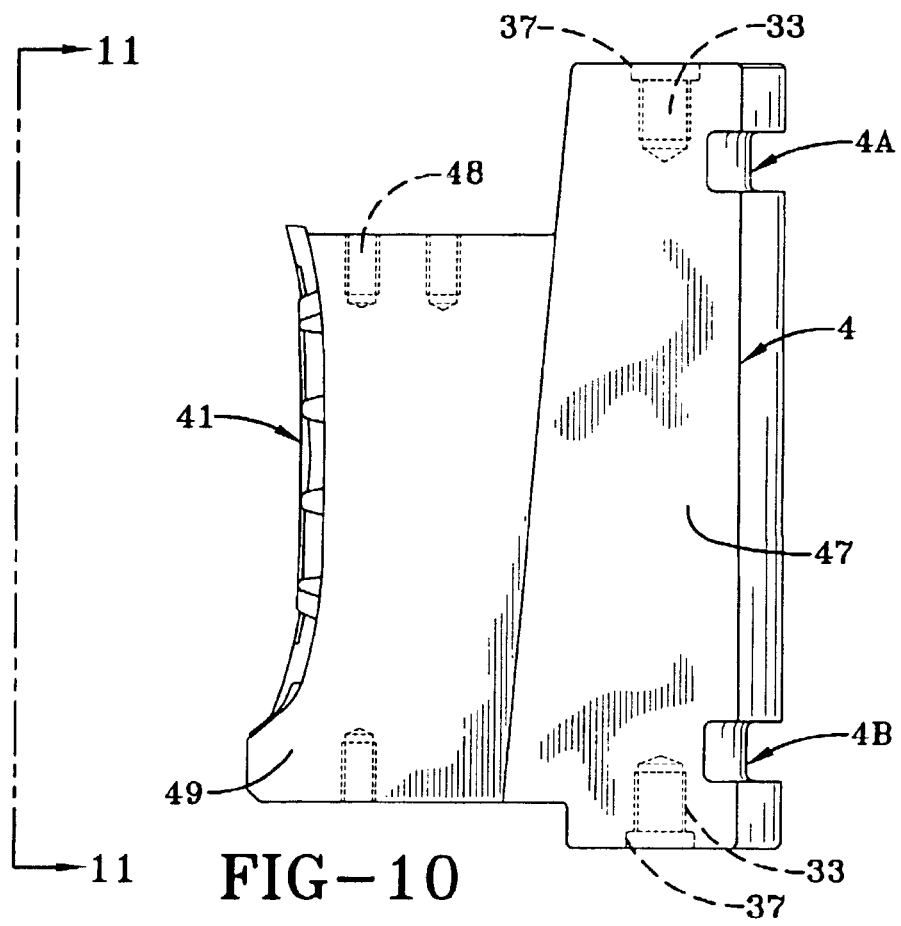
FIG. 10 is a side view of the tread forming segment of FIG. 9.
Figure 11:
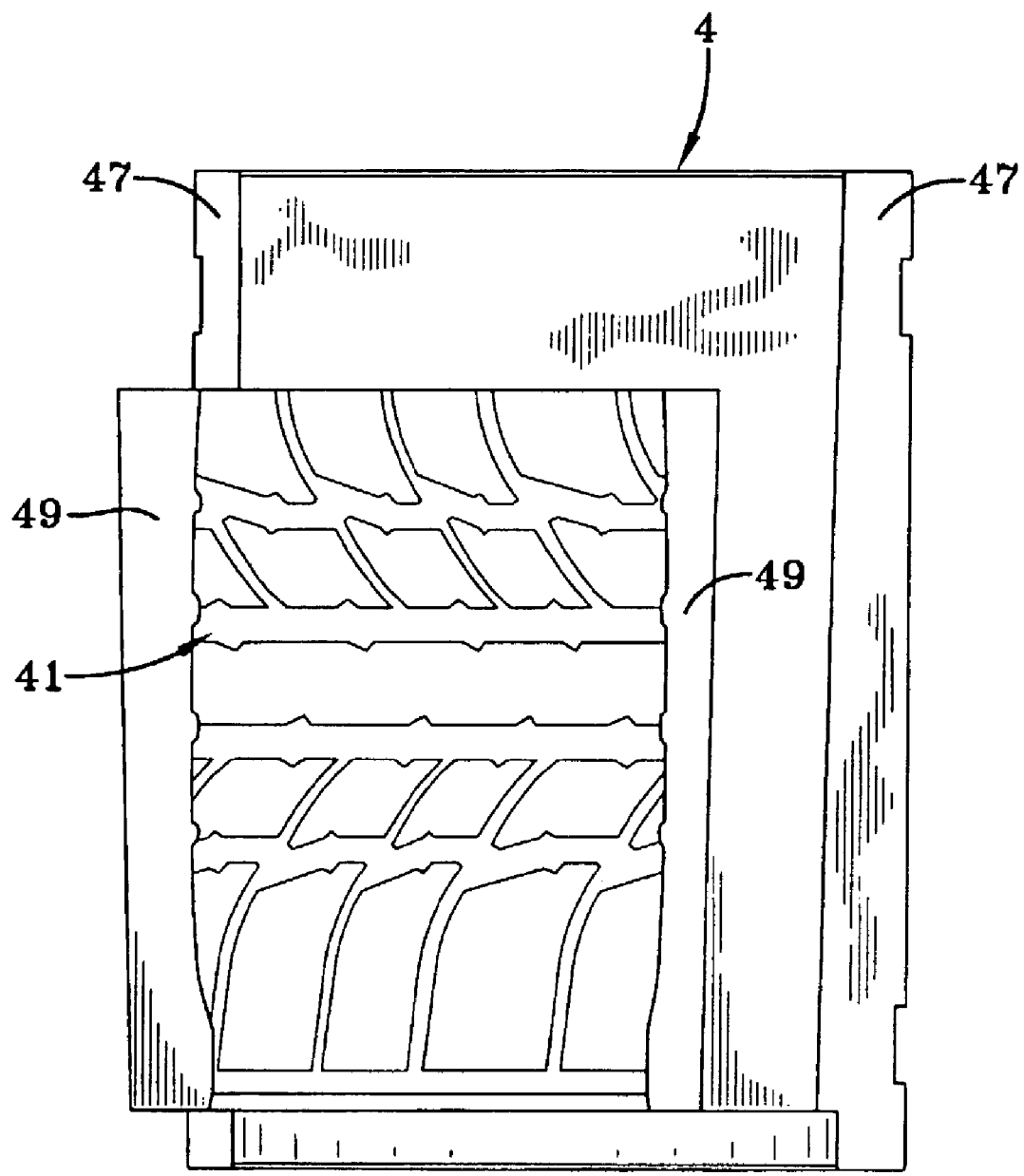
FIG. 11 is a plan view of the tread forming segment of FIG. 10.

With reference to FIGS. 9 through 12, an exemplary tread-forming segment 4 is illustrated. The tread-forming segment 4 can be one piece or include a removably attachable tread forming face 41. The tread forming face 41 provides the necessary ribs, bridgework and blading for forming the tread pattern on the tire 100. As shown, a small arcuate section of this tread forming face 41 is provided with each segment 4. As illustrated, in the particular mold 2 fifteen such segments 4 are used to complete a 360° circumference. The tread forming segments 4 include radially inward extending abutting surface 49 and 47. It is particularly important that the tread forming surfaces 41 come into close abutting contact as the mold closes. The space or gaps at the parting lines between various segments is thus minimized resulting in minimal flash occurring during the curing process. As shown from the top view in FIG. 9, a slotted oblong recess is provided 37 with a threaded opening 33 is provided. Both the top and bottom of the tread-forming segment 4 as illustrated in FIG. 10 have these features. Additionally, in the tread forming face 41 there is illustrated a plurality of threaded openings 48 which provide a means for lifting and fixturing. On the back face of each of the mold segments are machined grooves 4A and 4B as illustrated. These grooves 4A and 4B provide a means for clamping during machining. As illustrated in FIG. 11, the dash lines represent the tread forming face 41. It is understood that these tread forming faces 41 can be removed from the segment when one desires to change the tread pattern of a particular tire. It is further understood that the radial extension of the tread forming segments can be varied as tire size changes occur so that larger diameter tires can be built using the same self-locking mold assembly. This is accomplished by simply removing the tread forming segment 41 from the rest of the segment 4 and replacing it with a thicker or thinner tread form face 41.

Figure 12:
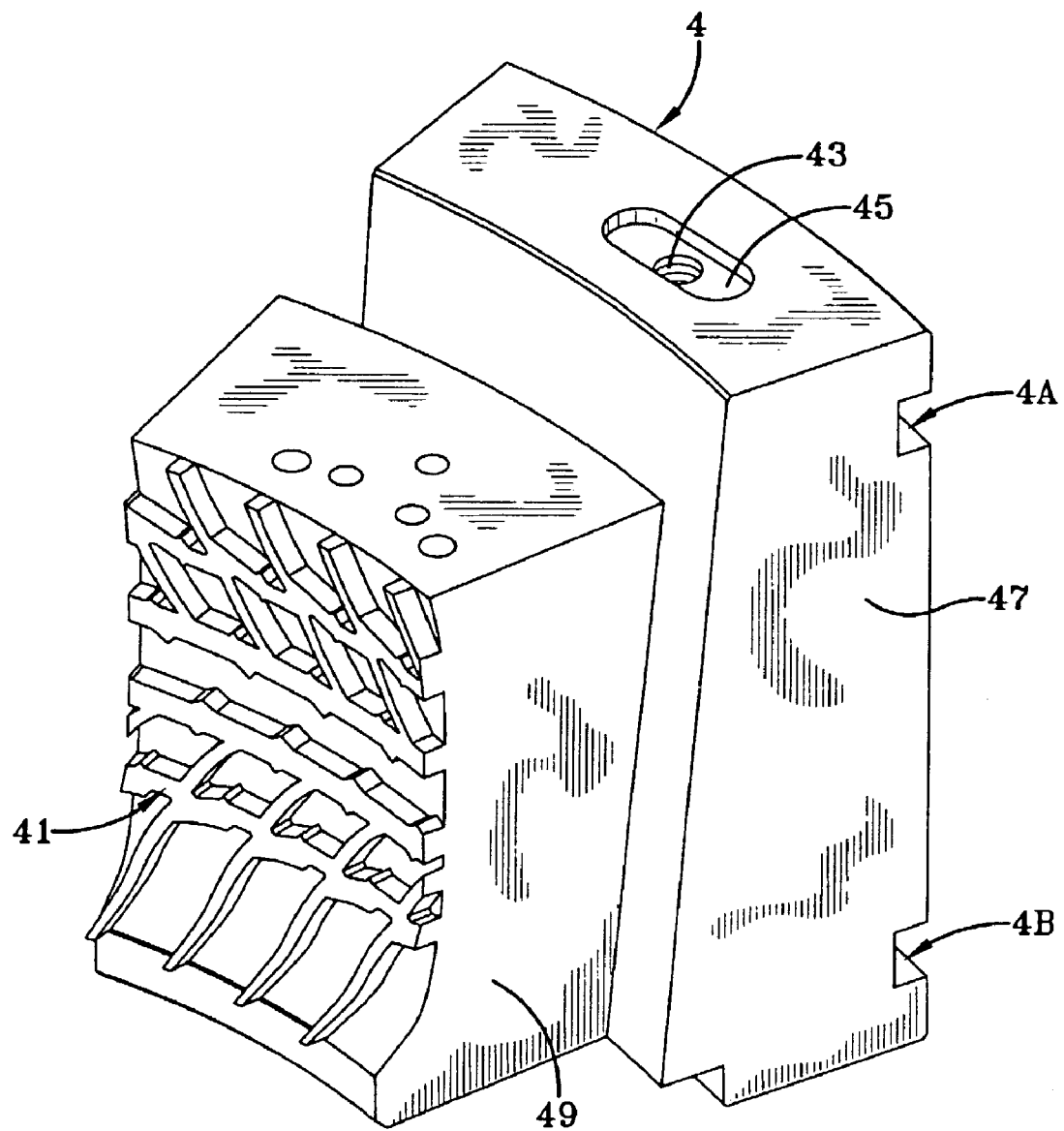
FIG. 12 is a perspective view of the tread forming segment of FIGS. 8, 9 and 10.

As shown in FIG. 12, each tread forming face 41 may be circumferentially offset relative to the back portion of the tread-forming segment 4. What this means is the abutting surfaces 47 and 49 of the assembly may be offset circumferentially as illustrated. It is understood that on the radial movement these surfaces will come into abutting alignment with adjacent tread forming segments as illustrated in FIG. 2 and in the closed position of FIG. 3.

Figure 15:
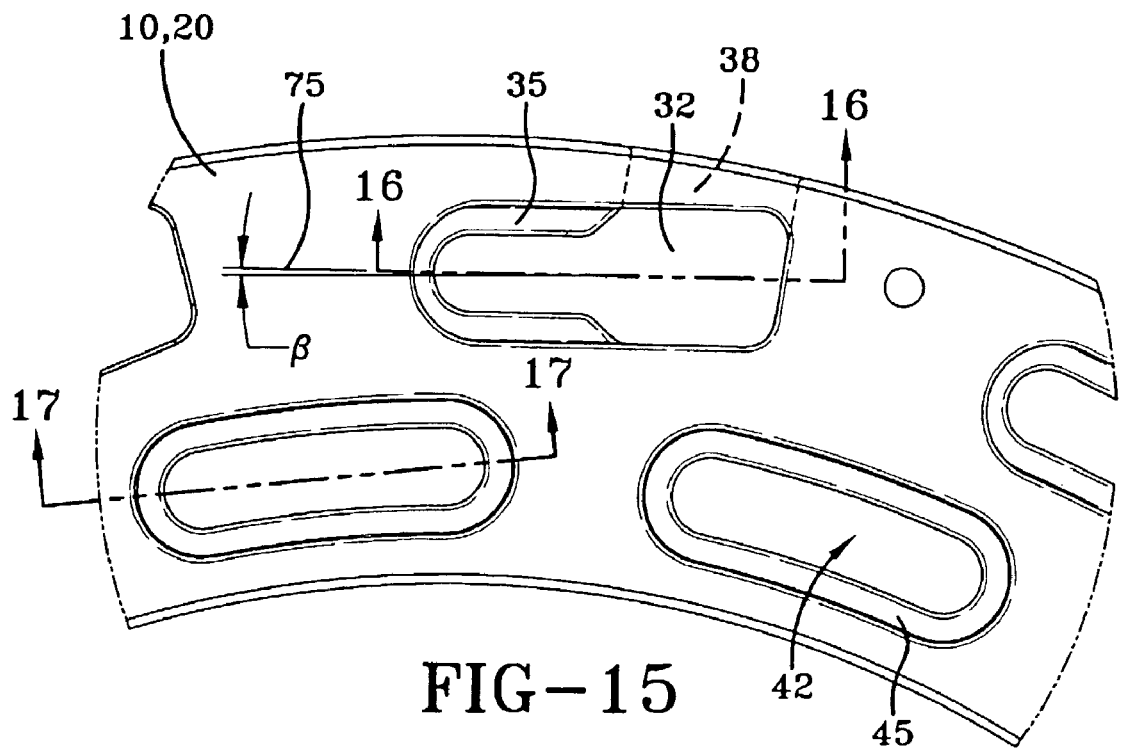
FIG. 15 is an enlarged fragmentary view taken from FIG. 14.

With reference to FIGS. 13, 14, 15, 16 and 17, there is illustrated the top breach locking ring 10 and bottom breach lock ring 20. Each of these breach lock rings 10, 20 are identical, one forming the top and one forming the bottom, respectively. As illustrated in FIG. 13, a radially outer plurality of slotted openings 32 and a radially inner plurality of oblong openings 42 are illustrated. The radially outer slotted openings 32 engage the threaded fastener 34 and collar 36 that are attached at hole 33 to each of the plurality of tread forming segments 4. The radially inner row or plurality of slotted openings 42 engage the top and sidewall forming plate 8 and 6 at the threaded fasteners 44. With particular reference to FIG. 15, an enlarged fragmentary view is shown of the slotted opening 32 and the curved or arcuate opening 42.

Figure 16:
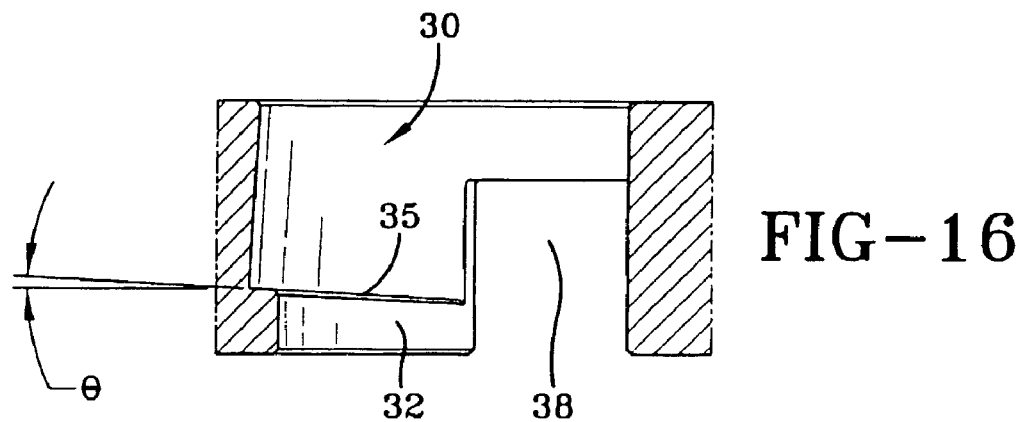
FIG. 16 is a cross-sectional view of one of the radially outer means for locking the segments taken along lines 16-16 of FIG. 15.
Figure 17:
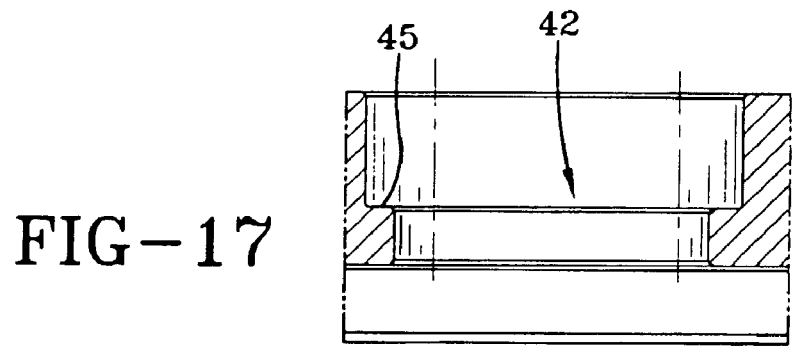
FIG. 17 is a cross-sectional view of one of the radially inner means for locking the top or bottom sidewall forming plate.

With reference to the slotted opening 32 as illustrated a connecting bridge 38 spans across the slotted opening 32 and provides enhanced structural integrity of the breach locking rings 10 and 20. The radially movable tread segments 4 have a threaded fastener 34 with a collar 36 attached to each segment. When the segments 4 are moved radially inwardly they pass through the slot 32 under the bridge 38 and the bolt collar 36 having a flanged surface engages the shoulders 35. As illustrated in FIG. 16 in the cross sectional view the locking means 30 includes passing the threaded fastener 34 and the bolt collar 36 through the slot 32 and then engaging the inclined shoulder 35. As illustrated, each of the slotted openings 32 inclined shoulders 35 are sloped at an angle θ of approximately 1° to 15°. As the bolt collar 36 engages this ramp surface of the shoulder 35 the collar 36 rides up the ramp increasing the force holding the entire top and bottom breach lock rings against the tread forming segments 4. Simultaneously, as the fastener 34 and collar 36 are being increased in tension by riding up the shoulder 35, the path of the outer slotted opening 32 along the shoulder 35 is following a straight line path inclined radially inward at an angle β as illustrated in FIG. 15. This slight radially inward path 75 of the slotted opening 32 ensures that as the breach locking rings 10, 20 are twisted and the threaded fastener 34 is engaging the shoulders 35 it is forced radially inward providing additional compression into the tread 100 of the tire to be cured. In a very clever and novel way this reduces the amount of expansion the tire 100 will have to undergo to engage the tread face 100.

With reference to the slotted oblong openings 42 it is noticed that these openings are on a cured or arcuate surface of a constant radius of curvature and that the shoulder 45 is not inclined. These plurality of radially inner openings 42 engage the bolt collars 46 and the threaded fasteners 44 which are secured to the bottom sidewall forming plate 6 and to the tread shoulder forming ring 5 as illustrated in FIG. 2. The slotted openings 42 enable the entire top and bottom of the mold 2 to be removed from the tread forming segments as illustrated. It should be understood that the top sidewall forming plate 8, the tread shoulder-forming ring 5 is securely attached to the breach lock ring 10 as illustrated. The sliding arrangement of the top ring 10 ensures that once the ring 10 is in place only the top ring 10 rotates. Therefore it does not scuff or scratch the sidewall of the tire, as there is no rotation of these sidewall plates 6, 8 relative to the tread forming segments. Only the top and bottom breach lock ring 10, 20 provide any angular movement when the mold is opened or closed and simultaneously the segments 4 move only radially out or in as the rings 10, 20 rotate. As illustrated this creates a rather unique assembly method.

With reference to FIGS. 18 and 19, the tread shoulder-forming ring 5 is illustrated. As shown, the tread shoulder ring 5 has a tread shoulder face 51 and threaded holes 52. The threaded holes 52 are adapted to accept the threaded fasteners 44 of the top and bottom breach lock ring as discussed previously. A very important feature of the tread shoulder face 51 is that it has a radially inner diameter $D_T$ and a radially outer diameter $D_O$ as shown. The diameter $D_O$ that is larger than $D_T$ correspondingly abuts against the tread forming faces 41 of the radially movable segments 4. The tread shoulder ring 5 is attached to the top sidewall forming plate 8 and top breach lock ring 10 as illustrated, having the smaller diameter $D_T$ abutting at the sidewall diameter $S_T$. When the tire mold 2 is opened and the top plate assembly 8 is removed the tire building drum assembly 7 with an uncured tire 10 can be inserted directly into the mold 2 as previously discussed without having to clear the smaller diameter of the tread shoulder face 51. This feature is believed to be unique in tire molding and provides a superior way of building uncured tires to the almost as-molded finished diameter. As can be appreciated by using the inclined slotted openings 32 and removing the tread shoulder ring 5 along with the top plate 6, one can mold the tire 100 at a diameter only slightly larger than the diameter of the tire as it is built on the building core 7. As illustrated, the expansion required of the uncured tire into the mold radially is less than 5%, preferably approximately 1% or less.

Once the tire 100 is assembled into the mold 2 and the mold 2 is closed, the entire assembly can then be cured. As shown, the self-locking mold provides the entire assembly needed to cure the tire. This mold permits all the curing operations to occur internally within the mold without requiring external presses. This greatly reduces the capital expenditure required for providing cured tires which greatly increases the efficiency and flexibility required to manufacture and cure tires.

What is claimed is:

1. A method of curing a tire under heat and pressure, comprising:
   building an uncured tire assembly on a building drum core assembly;
   preheating a segmented mold, the mold including a plurality of radially movable tread forming segments and a top plate, the top plate having a sidewall forming ring and a tread shoulder forming ring, the tread shoulder forming ring being positioned for abutment with the tread forming segments so as to mold a shoulder portion of the tread;
   opening the mold by moving the sidewall forming ring and the tread shoulder forming ring away from the radially movable tread forming segments;
   expanding the radially movable segments;
   inserting the uncured tire assembly while mounted on the building drum core into the open mold;
   closing the mold by moving the sidewall forming ring and the tread shoulder forming ring toward the radially movable tread forming segments;
   contracting the radially movable segments;
   applying pressure to the building drum core forcing the uncured tire assembly against a tread belt and the tread forming segments;
   curing the tire assembly and tread belt to form the tire;
   opening the mold by moving the sidewall forming ring and the tread shoulder forming ring away from the radially movable, tread forming segments;
   radially expanding the tread forming segments;
   removing the cured tire from the mold.

2. A method according to claim 1, further comprising:
   locking the mold into a locked, self-contained and transportable configuration prior to applying pressure.

3. A method according to claim 2, wherein contracting the radially movable tread forming segments and locking the mold are substantially contemporaneously effected by engaged top and bottom mold locking rings.

4. A method for curing a tire under heat and pressure, comprising the steps:
   a. building an uncured tire assembly on a building drum core to a substantially as-molded finished tire diameter, the building drum core having a center axis;
   b. unlocking a locking ring of a self-locking segmented mold, the mold including a plurality of radially movable tread forming segments; a top sidewall forming plate having a sidewall forming ring and a tread shoulder forming ring, the tread shoulder forming ring being positioned for abutment with the tread forming segments so as to mold a shoulder portion of the tread; and a bottom sidewall forming plate;
   c. opening the mold by moving the sidewall forming ring and the tread shoulder forming ring away from the radially movable tread forming segments;
   d. radially expanding the radially movable tread forming segments to expose an opening sufficiently large to allow loading of the building drum core and uncured tire assembly axially into the mold;
   e. loading the building drum core and uncured tire assembly axially onto the bottom sidewall forming plate of the mold;
   f. closing the mold by moving the sidewall forming ring and the tread shoulder forming ring toward the radially movable tread forming segments;
   g. contracting the radially movable tread forming segments;
   h. engaging the locking ring to further radially contract the radially movable tread forming segments and to lock the mold in a self-contained, self-locking unitary mold assembly;
   i. applying pressure to the building drum core forcing the uncured tire assembly against a tread belt and the tread forming segments; and
   j. curing the tire assembly and tread belt to form the tire.

5. A method according to claim 4, wherein the locking ring engages with a secondary bottom locking ring to radially contract the movable segments and to lock the mold in the self-contained, self-locking unitary mold assembly.

6. A method according to claim 5, wherein the locking ring and the secondary bottom locking ring rotate to lock the mold.

7. A method according to claim 4, further comprising:
   relocating the self-contained, self-locking unitary mold assembly while curing the tire assembly and tread belt to form the tire.

8. A method for curing a tire under heat and pressure, comprising:
   a. building an uncured tire assembly on a building drum core to a substantially as-molded finished tire diameter, the building drum core having a center axis;
   b. preheating a self-locking segmented mold;
   c. unlocking a locking ring of the self-locking segmented mold, the mold including a plurality of radially movable tread forming segments; a top sidewall forming plate including a sidewall forming ring and a tread shoulder forming ring the tread shoulder forming ring being positioned for abutment with the tread forming segments so as to mold a shoulder portion of the tread; and a bottom sidewall forming plate;
   d. opening the mold by moving the sidewall forming ring and the tread shoulder forming ring away from the radially movable tread forming segments;
   e. radially expanding the radially movable tread forming segments to expose an opening sufficiently large to allow loading of the building drum core and uncured tire assembly axially into the mold;
   f. loading the building drum core and uncured tire assembly axially onto the bottom sidewall forming plate of the mold;
   g. closing the mold by moving the sidewall forming ring and the tread shoulder forming ring toward the radially movable tread forming segments;
   h. contracting the radially movable tread forming segments; and i. engaging the locking ring to further radially contract the radially movable tread forming segments and to lock the mold in a self-contained, self-locking unitary mold assembly;

j. applying pressure to the building drum core forcing the uncured tire assembly against a tread belt and the tread forming segments;

k. curing the tire assembly and the tread belt to form the tire;

l. opening the mold by moving the sidewall forming ring and the tread shoulder forming ring away from the radially movable tread forming segments;

m. radially expanding the radially movable tread forming segments; and n. removing the cured tire from the mold.

\* \* \* \* \*